United States Patent [19]
Oku

[11] Patent Number: 5,144,656
[45] Date of Patent: Sep. 1, 1992

[54] TRANSMITTER FOR COMMUNICATION EQUIPMENT

[75] Inventor: Hidenori Oku, Hachioji, Japan

[73] Assignee: Kabushiki Kaisha Toshiba, Kawasaki, Japan

[21] Appl. No.: 475,003

[22] Filed: Feb. 5, 1990

[30] Foreign Application Priority Data

Feb. 6, 1989 [JP] Japan ................ 1-12815[U]

[51] Int. Cl.$^5$ .................... H04M 1/00; H04R 25/00
[52] U.S. Cl. .................. 379/433; 379/428; 379/437; 381/169; 381/157
[58] Field of Search ............. 379/433, 428, 437, 440, 379/370; 381/157, 158, 169

[56] References Cited

U.S. PATENT DOCUMENTS

| | | | |
|---|---|---|---|
| 4,263,484 | 4/1981 | Hisatsune et al. | 381/157 |
| 4,776,009 | 10/1988 | Gumb et al. | 379/433 |
| 4,803,724 | 2/1989 | Utoh et al. | 381/158 |

FOREIGN PATENT DOCUMENTS

| | | | |
|---|---|---|---|
| 2831401 | 1/1980 | Fed. Rep. of Germany | 381/157 |
| 3634620 | 4/1988 | Fed. Rep. of Germany | 379/437 |
| 2064265 | 6/1981 | United Kingdom | 379/437 |

Primary Examiner—James L. Dwyer
Assistant Examiner—Jason Chan
Attorney, Agent, or Firm—Foley & Lardner

[57] ABSTRACT

A transmitter for communication equipment, including a casing with a speaker piece. The speaker piece is provided with a plurality of outer microphone through holes. An air chamber housing is arranged on an inner surface of the speaker piece and includes an air chamber communicating to the outer microphone holes. The air chamber housing has an inner microphone hole formed through it to open at an upper surface thereof. A microphone holder is integrally formed with the upper surface of the air chamber housing to communicate to the inner microphone hole. The microphone holder is adapted to receive a condenser microphone. A jack is integrally erected on the upper surface of the air chamber housing.

3 Claims, 3 Drawing Sheets

TRANSMITTER FOR COMMUNICATION EQUIPMENT

BACKGROUND OF THE INVENTION

The present invention relates to a transmitter of communication equipment and particularly relates to a transmitter which is improved in acoustic characteristic at a high frequency band and is prevented from being adversely affected due to static electricity.

A speaker piece of a casing of the conventional handset is usually provided with microphone holes for transmitting voice signals. A microphone is mounted within the speaker piece so that it transduces voice signals into electric signals. Condenser microphones are widely used as the microphone. However, conventional transmitters of communication equipment, using condenser microphones, are considerably high in gain at a high frequency band, more than 3 KHz for example, and produce a considerable distortion of voice output in a high-pitched tone region. This involves a problem, in that it is rather hard to hear the voice output.

Moreover, the condenser microphone is subject to electrostatic breakdown, and the output level of the microphone can deteriorate or the microphone made inoperative due to static electricity.

SUMMARY OF THE INVENTION

Accordingly, it is an object of the present invention to provide a transmitter of communication equipment, in which transmitter it is easy to hear the voice output and the diaphragm of the microphone is less liable to breakdown than the microphone of prior art transmitters.

Another object of the present invention is to provide a transmitter of communication equipment, of which parts are small in number as compared to transmitters of the prior art, enabling ease of rigging thereof and a saving of labor in mass production.

In view of these and other objects, the present invention provides a transmitter of communication equipment, comprising: a casing including a speaker piece, the speaker piece having a plurality of outer microphone holes formed therethrough and including an inner surface; an air chamber housing arranged on the inner surface of the speaker piece and including an air chamber communicating to the outer microphone holes, the air chamber housing having an upper surface and an inner microphone hole formed therethrough to open at the upper surface thereof; a microphone holder integrally formed with the upper surface of the air chamber housing to communicate to the inner microphone hole, the microphone holder being adapted to receive a condenser microphone; and a jack integrally erected on the upper surface of the air chamber housing.

The air chamber which is provided between the outer microphone holes and the microphone enables the output level at a high frequency band to be reduced and, thereby, improves the acoustic characteristic of the transmitter. In addition, the air chamber ensures that the outer microphone holes and the diaphragm of the microphone are spaced at a predetermined distance so that the microphone is prevented from being adversely affected due to static electricity. In the present invention, the jack, the microphone and the bracket are integrally formed with the upper surface of the air chamber housing. This reduces the number of parts of the transmitter, thereby providing ease of rigging thereof and a labor saving in mass production.

DETAILED DESCRIPTION OF THE PREFERRED EMBODIMENTS

Preferred embodiments of the present invention will now be described with reference to the drawings.

Figure 7:
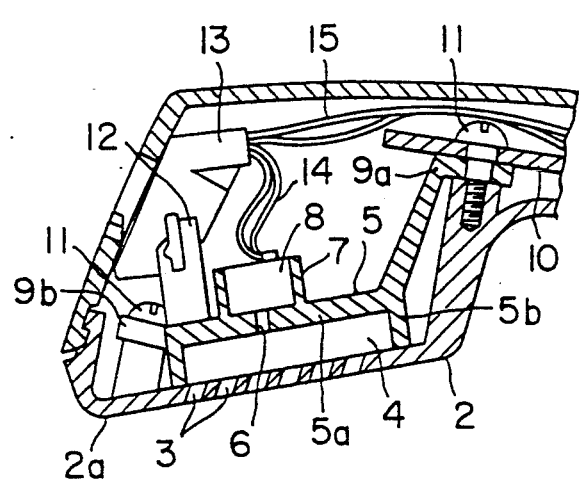
FIG. 7 is a vertical section of another embodiment of the present invention.
Figure 8:
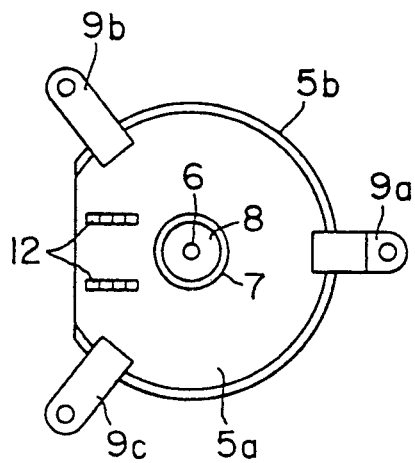
FIG. 8 is a plan view of the air chamber housing of FIG. 7.
Figure 9:
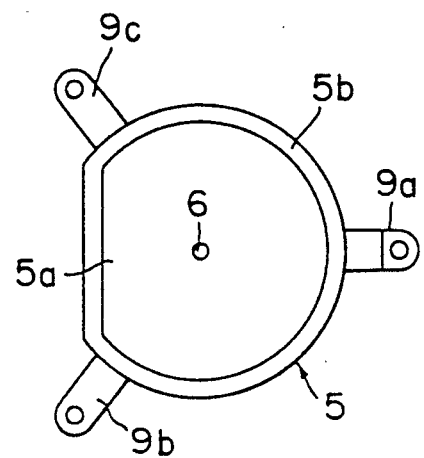
FIG. 9 is a bottom view of the air chamber housing of FIG. 7.

FIGS. 7 to 9 illustrate a transmitter of a handset which was developed before the present invention was accomplished. In the handset 1, a speaker piece or transmitter piece 2a of a lower casing 2 is provided with outer microphone through holes 3. An air chamber housing 5 containing an air chamber 4 is arranged on an inner surface of the speaker piece 2a. The air chamber housing 5 includes a disc-shaped top wall 5a and a circumferential wall 5b depending from the top wall 5a. The top wall 5a has an inner microphone hole 6 formed through the center thereof. A hollow cylindrical microphone holder 7 is formed integrally with an upper surface of the top wall 5a of the air chamber housing 5 to communicate to an outlet of the inner microphone hole 6. The microphone holder 7 receives an electret condenser microphone 8.

The air chamber housing 5 is provided with three attaching arms 9a, 9b and 9c formed to extend radially outwardly. The attaching arm 9a is fastened by means of machine screws 11 to the lower casing 2 together with a securing plate 10. The other attaching arms 9b and 9c are also secured to the lower casing 2 with machine screws 11. A pair of attaching plates 12 are erected on the upper surface of the air chamber housing 5, and a modular jack 13 is secured to the air chamber housing 5 by holding it between the attaching plates 12. The modular jack 13 is electrically connected to both lead wires 14 from the condenser microphone 8 and wiring 15 extending to a receiver.

When a user speaks in the vicinity of the speaker piece 2a of this transmitter, voice signals passes through the outer microphone holes 3 into the air chamber 4 and then reach to a front surface of the microphone 8 through the inner microphone hole 6. In the microphone 8, the voice signals are transduced into electric signals. The output signals from the microphone 8 are transmitted through the lead wires 14 to the jack 13 and then to a telephone base via a receiver cable. The air chamber 4 which is provided between the outer microphone holes 3 and the front surface of the microphone 8 reduces the output level at the high frequency band and thereby improves the transmitting characteristic of the transmitter in the high-pitched tone region. In addition, the air chamber 4 ensures that the outer microphone holes 3 and the diaphragm of the microphone 8 are spaced at a predetermined distance so that the microphone 8 is prevented from being adversely affected due to static electricity.

The transmitter of the embodiment above described succeeded both in improving the transmitting characteristic in a high frequency band and in preventing breakdown but it is desired to reduce the number of components in view of both ease of rigging thereof and saving of labor in mass production.

Figure 1:
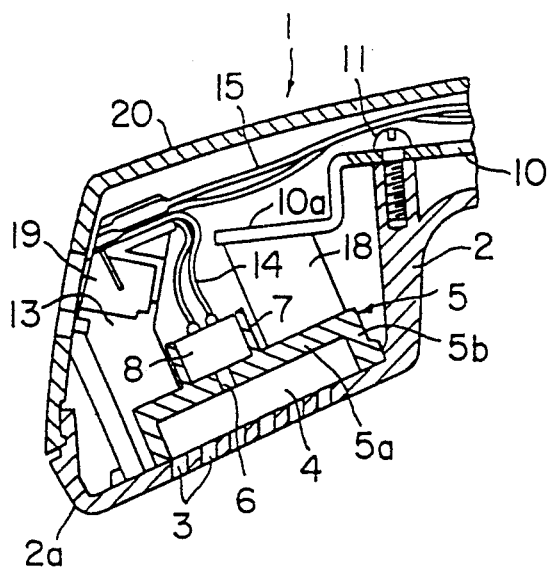
FIG. 1 is a fragmental sectional view of a transmitter of a handset according to the present invention.
Figure 2:
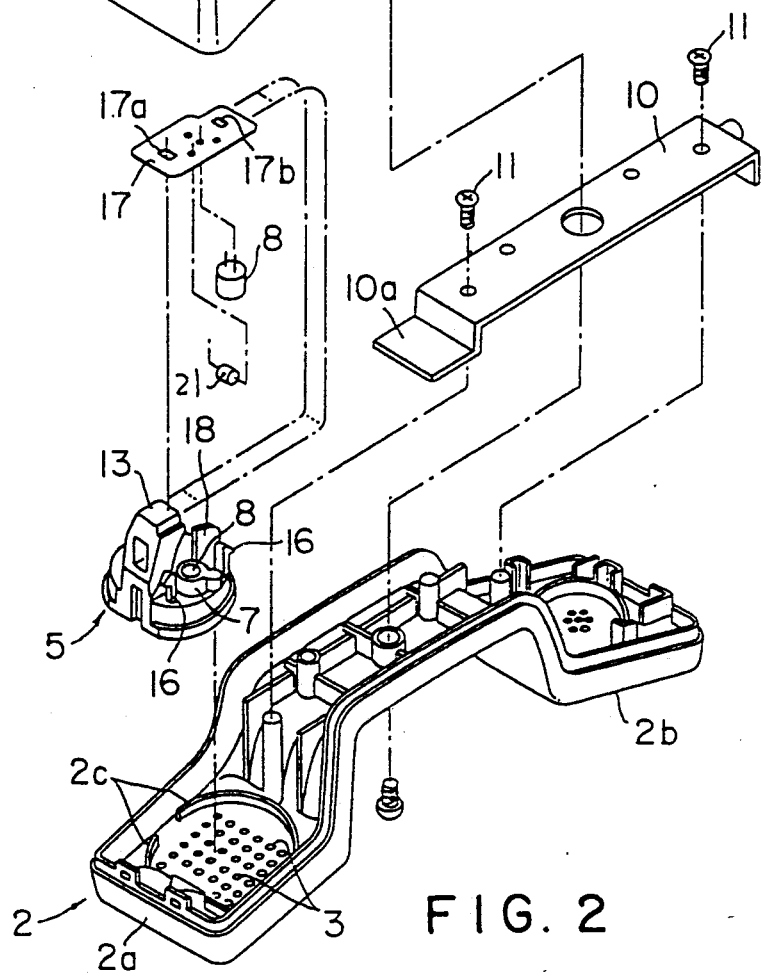
FIG. 2 is an exploded view of a handset using the transmitter of FIG. 1.
Figure 3:
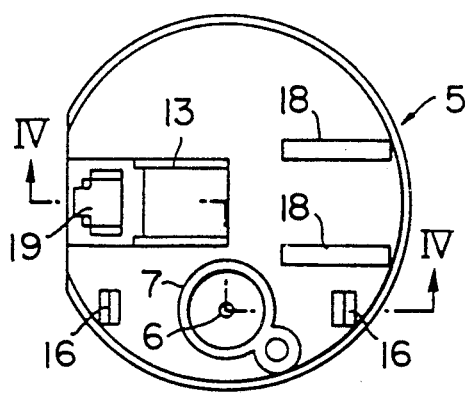
FIG. 3 is an enlarged plan view of an air chamber housing of FIG. 1.
Figure 5:
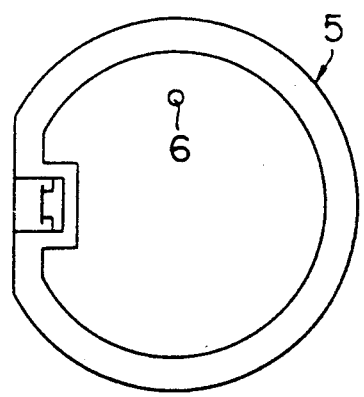
FIG. 5 is a bottom view of the air chamber housing of FIG. 3.

To improve the transmitter of FIGS. 7 to 9, there is proposed a transmitter of the handset of FIGS. 1 and 2, in which a plurality of outer microphone holes 3 are also formed through a speaker piece 2a of a lower casing 2 of the handset 1. The lower casing 2 includes an ear piece 2b.

A substantially annular rib 2c is formed on the inner surface of the speaker piece 2a of the lower casing 2 in such a manner that the rib 2c surrounds the inner openings of the outer microphone holes 3. The air chamber housing 5 is provided with an air chamber 4 and is arranged within the rib 2c. The air chamber housing 5 is composed of a disc-shaped top wall 5a and a circumferential wall 5b depending from the top wall 5a. The top wall 5a of the air chamber housing 5 has an inner microphone hole 6 formed through it. The inner microphone hole 6 is formed at a position eccentric radially outwardly from the center of the top wall 5a.

A hollow cylindrical microphone holder 7 is integrally formed with the upper surface of the top wall 5a so that the microphone holder 7 concentrically surrounds an outer opening of the inner microphone hole 6. An electret condenser microphone 8 is fitted within the microphone holder 7.

A pair of latches 16 and 16 are integrally formed with the upper surface of the top wall 5a of the air chamber housing 5 to extend upwards. The latches 16 and 16 are symmetrically arranged in such a manner that the microphone holder 7 is centrally placed between the latches.

In FIG. 2, reference numeral 17 indicates a microphone supporting plate, and the microphone 8 is mounted to a lower face of the microphone supporting plate 17. The microphone supporting plate 17 is mounted to the air chamber housing 5 by fitting the latches 16 and 16 into respective rectangular through holes 17a and 17a formed through it.

The air chamber housing 5 is provided at its upper face with a pair of brackets 18 and 18 integrally formed with it. Each of the brackets 18 and 18 has an inclined top surface 18a.

A modular jack 18 is integrally formed with the upper surface of the air chamber housing 5 at a position to oppose to the brackets 18 and 18.

According to the present invention, the air chamber housing 5, the microphone holder 7, the latches 16 and 16, the brackets 18 and 18, and the modular jack 13 are integrally molded of an ABS resin, for example.

Figure 4:
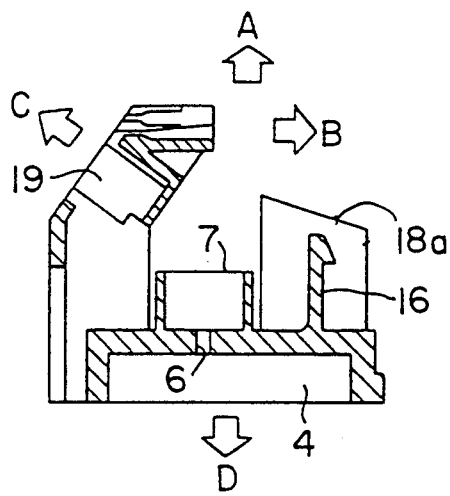
FIG. 4 is a view taken along the line IV—IV in FIG. 3.

In FIG. 4, arrows A, B, C and D indicate directions in which corresponding molds are drawn. In molding the air chamber housing 5, a mold for molding the microphone holder 7, the latches 16 and 16 and the brackets 18 and 18 is drown in the direction of the arrow A, a mold for forming the jack 13 in the direction B, a mold for molding a plug socket 19 of the jack in the direction C, and a mold for molding the air chamber 4 in the direction D.

Returning to FIG. 1, the air chamber housing 5 is arranged in position in the lower housing 2, and then a distal end portion 10a of the securing plate 10 is placed on the inclined tip surfaces 18a of the brackets 18 and 18. In this condition, the securing plate 10 is fastened to the lower casing 2 by machine screws 11, so that the air chamber housing 5 is pushed by the securing plate 10 toward the left hand in FIG. 1 and is urged against the rib 2c for positioning since the top surface 18a of each of the brackets 18 and 18 is inclined toward the right hand in the figure.

The lead wires 14 and 14 of the microphone 8 are connected to the modular jack 13, and wiring 15 extends from the modular jack 13 to the receiver.

The plug socket 19 of the jack 13 is adapted to receive a plug of a transmitter cable. An upper casing 20 is fitted to the lower casing 2 to protect components within the handset 1.

A Zener diode 21 is connected in parallel with output terminals of the electret condenser microphone 8 so that the transducing diaphragm of the microphone is protected by allowing electrostatic charges from the outside to flow through the Zener diode 21.

In the embodiment in FIGS. 1 to 5, the air chamber which is provided between the outer microphone holes and the microphone enables the output level at the high frequency band to be reduced and thereby improves the transmitting characteristic of the transmitter. In addition, the air chamber enables that the microphone is prevented from being adversely affected due to static electricity. The jack, the microphone and the brackets are integrally formed with the upper surface of the air chamber housing. This reduces the number of parts of the transmitter, thereby providing ease of rigging thereof and labor saving in mass production.

Figure 6:
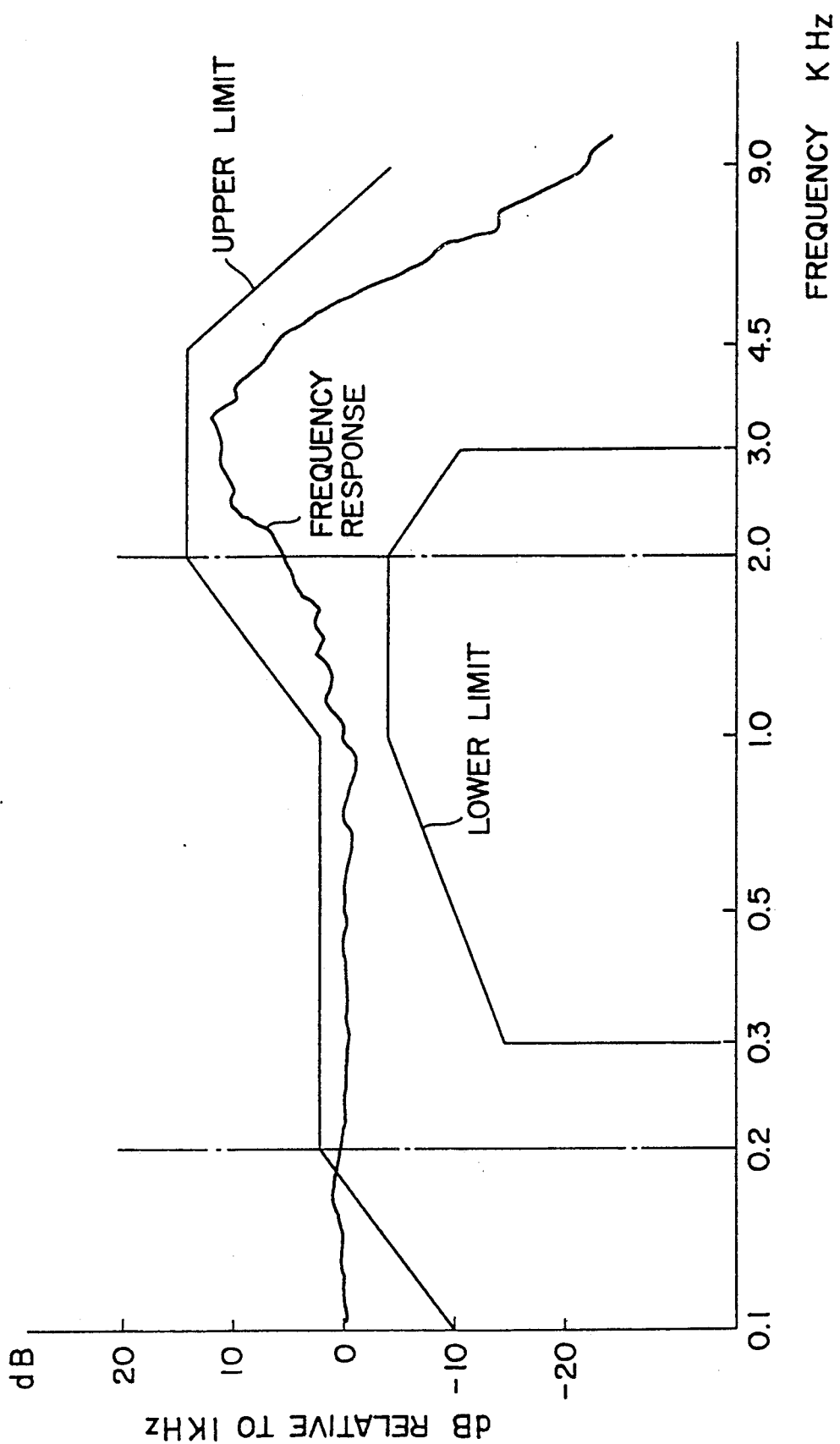
FIG. 6 is a graph showing a transmitting characteristic of a handset according to the present invention.

FIG. 6 illustrates the results of a test in which the transmitting characteristic of the handset of the present invention, above described, was tested according to EIA standards. It is clear from FIG. 6 that the output level of the high frequency band was adjusted to exceed that of the low frequency band by about 12 dB. Thus, the handset could fairly improve its transmitting characteristic.

It was further confirmed that when the distance between the speaker piece of the lower casing and the front surface of microphone 8 is 11 mm, the dielectric breakdown strength of the microphone 8 is 17 kV or more.

What we claim is:

1. A telephone handset, comprising:
    a casing, including a transmitter piece of the telephone handset, the transmitter piece having a plurality of outer microphone holes formed therethrough, and including an inner surface and a supporting plate for supporting a microphone;
    an air chamber housing arranged on the inner surface of the transmitter piece, including an air chamber communicating with the outer microphone holes, the air chamber housing having an upper surface and an inner microphone hole formed therethrough to open at the upper surface, the air chamber housing having a pair of latches formed integrally with the upper surface thereof, each of the latches including a distal end and adapted to engage with the supporting plate of the microphone for holding the supporting plate;

a microphone holder integrally formed with the upper surface of the air chamber housing, at a position eccentric radially outwardly from the center of the air chamber housing to communicate with the inner microphone hole, the microphone holder receiving the microphone;

a pair of brackets integrally formed with the upper surface of the air chamber housing to project upwards;

a securing plate depressed against the top surfaces of the brackets; and a jack integrally formed on the upper surface of the air chamber housing.

2. A telephone handset as recited in claim 1, wherein the brackets each include a downwardly inclined top surface.

3. A telephone handset as recited in claim 1, wherein the upper surface of the air chamber housing is spaced at a predetermined distance from the inner surface of the transmitter piece to assure that static electricity cannot interfere with transmissions from the transmitter piece.

* * * * *